2 Sheets--Sheet 1.

O. T. BEDELL.

Egg-Carriers.

No. 5,575. Reissued September 23, 1873.

Witnesses.

M. M. Livingston

Thos Lusch

Inventor.

Otis P. Bedell

THE NORRIS PETERS CO., PHOTO-LITHO., WASHINGTON, D. C.

2 Sheets--Sheet 2.

O. T. BEDELL.

Egg-Carriers.

No. 5,575. Reissued September 23, 1873.

Witnesses

M. M. Livingston

Thos Tirsch

Inventor.

Otis T. Bedell

THE NORRIS PETERS CO., PHOTO-LITHO., WASHINGTON, D. C.

UNITED STATES PATENT OFFICE.

OTIS T. BEDELL, OF NEW YORK, N. Y., ASSIGNOR, BY MESNE ASSIGNMENTS, TO WILLIAM D. TABER, PHILIP P. JOSEF, AND EDWARD STRIBER.

IMPROVEMENT IN EGG-CARRIERS.

Specification forming part of Letters Patent No. 48,507, dated July 4, 1865; reissue No. 5,575, dated September 23, 1873; application filed May 29, 1873.

*To all whom it may concern:*

Be it known that I, OTIS T. BEDELL, of the city of New York and State of New York, have invented certain new and useful Improvements in Egg and Fruit Holders or Carriers, of which the following is a clear and exact description, which will enable others skilled in the art to make and use the same, reference being had to the accompanying drawing forming part of this specification, in which—

Figure 1:
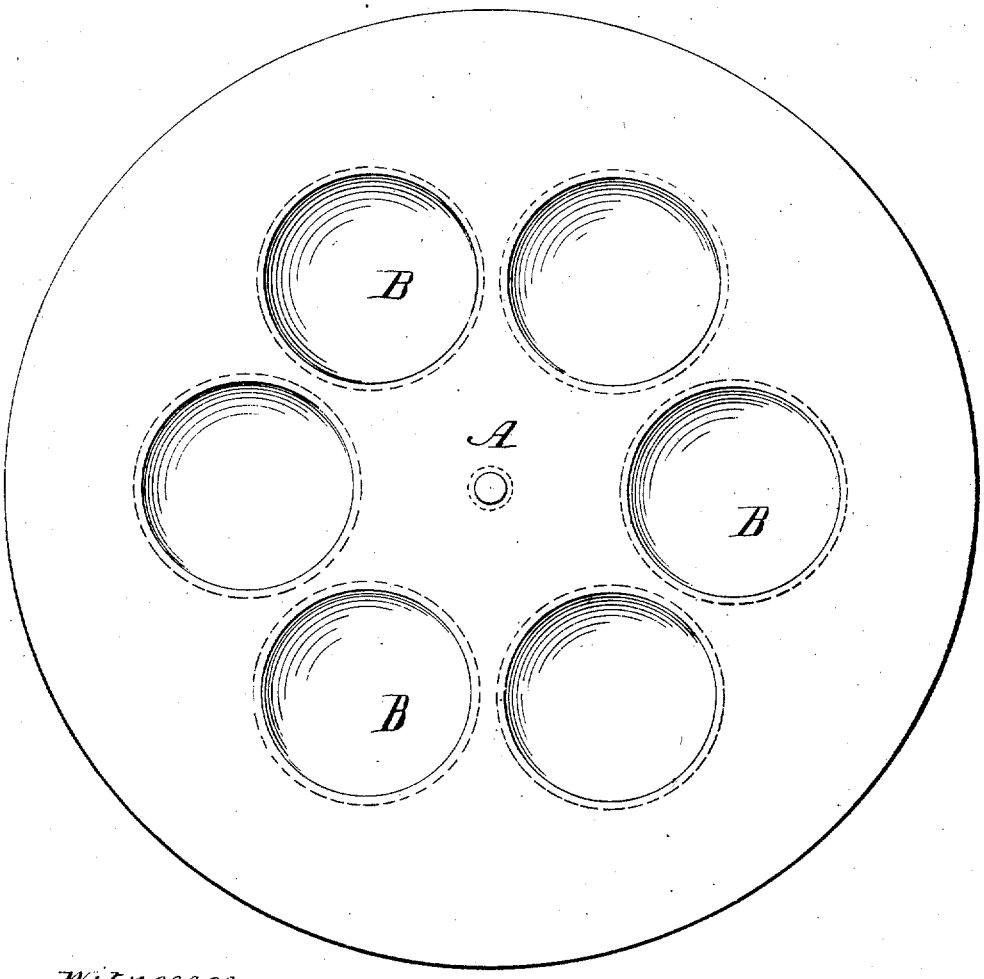
Figure 2:
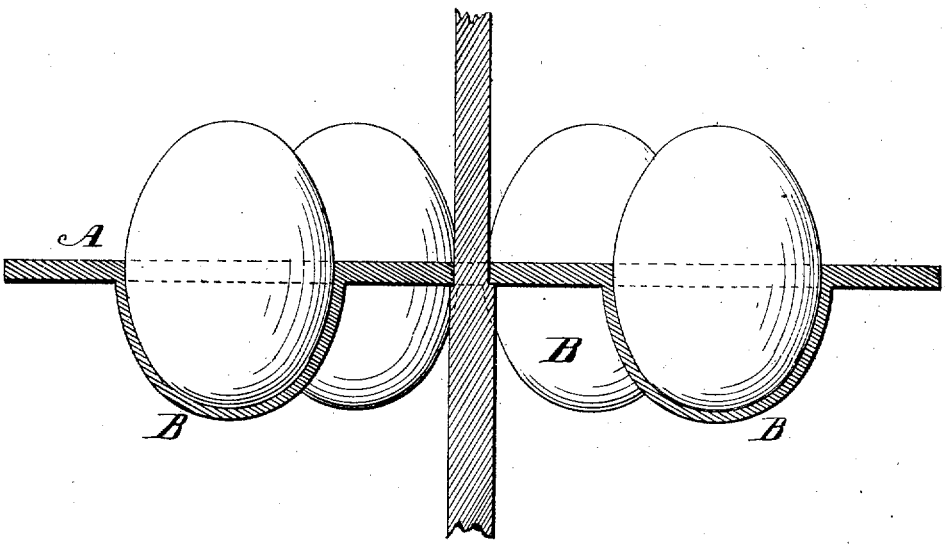

Figure 1 represents a plan or top view of this invention. Fig. 2 is a transverse vertical central section of the same.

Similar letters of reference indicate like parts.

This invention consists in a plate or disk made of india-rubber or other suitable material, and provided with a series of pockets, made of india-rubber or other soft or flexible material, in such a manner that each plate or disk is capable of holding as many eggs as it has pockets; and, when said disks or plates are fitted into a barrel or box, and their pockets filled with eggs, they can readily be placed one on top of the other, and the eggs can be shipped to any distance without danger of breakage.

A represents a disk or plate of any desirable form and shape, and made of any suitable material, though I use, by preference, india-rubber or gutta-percha. This plate is provided with a series of pockets, B, each capable of holding an egg, and these pockets are to be made of india-rubber or other soft or flexible material. If the plate or disk is made of india-rubber the pockets will be cast solid with the same, and I propose to make proper molds, and manufacture my egg-holders out of such material. But it is obvious that the plates or disks might be made of leather, or of wood, or metal, or other suitable material, and the pockets inserted into them in any desirable manner; and the pockets, instead of being made of india-rubber, might be made of leather, felt, or other suitable material, and might be lined or covered with leather, felt, or other soft material.

In manufacturing my egg and fruit carrier I propose in some cases to furnish each plate with a series of pockets of unequal size, so that each pocket can be filled with an egg which will fit the same exactly, or the pockets in each plate may be of uniform size, either adapted to large eggs or small ones.

When the plates are to be used for packing eggs I propose to fit them into a box or barrel, and when the pockets of the first plate or disk are filled with eggs it will be placed into said box or barrel; then the second on top of the first, and so on until the box or barrel is filled, the pockets of each succeeding disk being made to rest upon the tips of the eggs in the pockets below it. By this means a large quantity of eggs can be packed in a box or barrel and forwarded to any desired distance without danger of breakage.

In order to keep the disks or plates securely in place, one above the other, they may be provided with central holes *a*, so that each disk or plate can be put on a rod rising from the center of the box or barrel; and in this case I propose to construct said rod with as many shoulders as there will be plates or disks, and to reduce the holes in said disks or plates gradually to fit to the gradually-diminishing size of the rod.

I do not limit my claim to the depth of the pockets, as shown, (about one half of the length of the egg,) as it is obvious they could be made of any desired depth, it being, however, an advantage in point of economy in manufacture and in facility of handling to form them of only such depth as, while retaining the eggs in a vertical position, they leave enough exposed by which to easily handle or remove them.

I claim as new and desire to secure by Letters Patent—

1. The egg-carrier A, having pockets B, as and for the purpose set forth.

2. The egg-carrier A, having pockets B and aperture *a*, as and for the purpose set forth.

OTIS T. BEDELL.

Witnesses:

RICHD. C. GREEN,

GEO. F. SHANNON.